(12) United States Patent
Noldus et al.

(10) Patent No.: US 9,001,730 B2
(45) Date of Patent: Apr. 7, 2015

(54) METHOD AND SYSTEM FOR MESSAGE ROUTING IN IMS AND CIRCUIT SWITCHED NETWORKS

(75) Inventors: Rogier August Caspar Joseph Noldus, Goirle (NL); Nancy Margaret Greene, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 652 days.

(21) Appl. No.: 12/994,298

(22) PCT Filed: May 23, 2008

(86) PCT No.: PCT/NL2008/050304
§ 371 (c)(1),
(2), (4) Date: Feb. 15, 2011

(87) PCT Pub. No.: WO2009/142473
PCT Pub. Date: Nov. 26, 2009

(65) Prior Publication Data
US 2011/0134843 A1 Jun. 9, 2011

(51) Int. Cl.
*H04W 4/00* (2009.01)
*H04W 60/00* (2009.01)
*H04L 29/06* (2006.01)

(52) U.S. Cl.
CPC ......... *H04W 60/005* (2013.01); *H04L 65/1073* (2013.01); *H04L 65/1016* (2013.01)

(58) Field of Classification Search
USPC ................. 370/328, 338, 352, 401, 465–467; 455/433, 435.1, 466
See application file for complete search history.

(56) References Cited

U.S. PATENT DOCUMENTS

| | | | |
|---|---|---|---|
| 2007/0110076 A1 | 5/2007 | Brouwer et al. | |
| 2007/0135146 A1* | 6/2007 | Rezaiifar et al. | 455/466 |
| 2008/0186929 A1* | 8/2008 | Rice et al. | 370/338 |
| 2008/0219241 A1* | 9/2008 | Leinonen et al. | 370/352 |
| 2009/0129372 A1* | 5/2009 | Pandey et al. | 370/352 |
| 2009/0144429 A1* | 6/2009 | Astrom | 709/227 |
| 2010/0290456 A1* | 11/2010 | Mutikainen et al. | 370/352 |

FOREIGN PATENT DOCUMENTS

| | | |
|---|---|---|
| EP | 1571864 A1 | 9/2005 |
| EP | 1763262 A1 | 3/2007 |
| TW | 2006/07277 | 2/2006 |
| TW | 200818774 | 4/2008 |

(Continued)

OTHER PUBLICATIONS

International Search Report for PCT/NL2008/050304, mailed Apr. 7, 2009.

(Continued)

*Primary Examiner* — Kan Yuen
(74) *Attorney, Agent, or Firm* — Nixon & Vanderhye P.C.

(57) ABSTRACT

Method and gateway unit for registering a user terminal (34) of a multimedia subscriber being a subscriber of a circuit switched network (32), in an IP multimedia system (IMS) network (31). Registration in the IMS network (31) of a first contact address associated with a circuit switched communication capability of the user terminal (34) for regular communication purposes is used, as well as registration in the IMS network (31) of a second contact address associated with a circuit switched communication capability of the user terminal (34) for messaging purposes.

14 Claims, 6 Drawing Sheets

(56) References Cited

FOREIGN PATENT DOCUMENTS

| WO | WO 2004/100431 A2 | 11/2004 |
| WO | WO 2006/117107 | 11/2006 |

OTHER PUBLICATIONS

Written Opinion of the International Searching Authority for PCT/NL2008/050304, mailed Apr. 7, 2009.

J. Rosenberg et al., SIP: Session Initiation Protocol, Network Working Group, Request for Comments: 3261, Jun. 2002, 269 pages.

3GPP TS 23.204 v8.1.0 (Mar. 2008), 37 pages.

3GPP TS 23.228 v8.4.0 (Mar. 2008), 234 pages.

3GPP TS 29.002 v8.5.0. (Mar. 2008), 916 pages.

English Translation of Office Action issued Apr. 8, 2013 in application No. 098114269 & Search Report filed on Apr. 29, 2013 in application No. 098114269 (4 Pages).

* cited by examiner

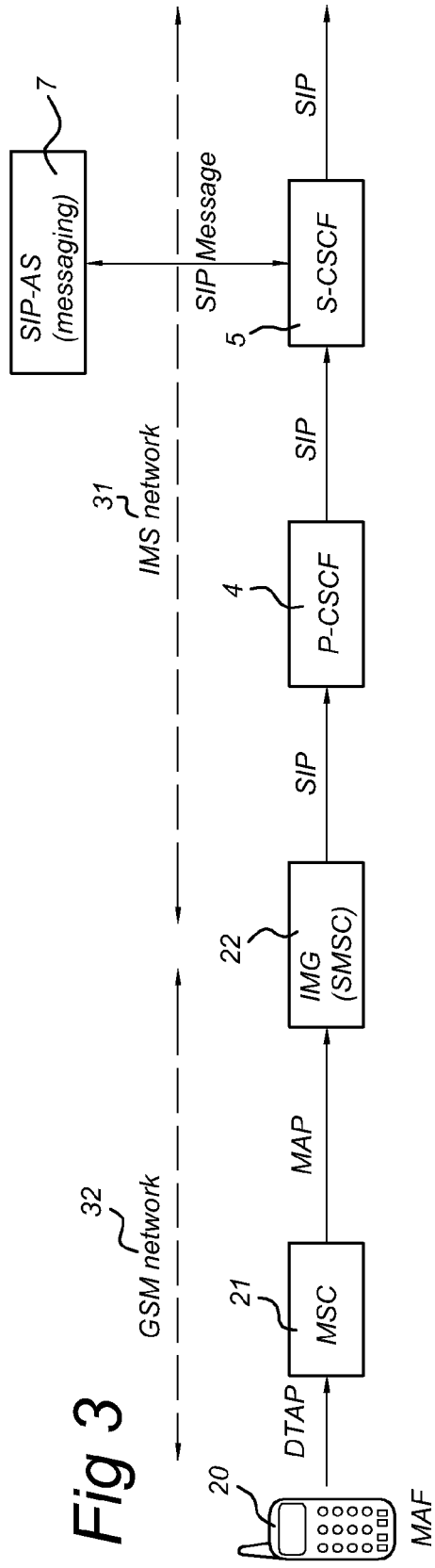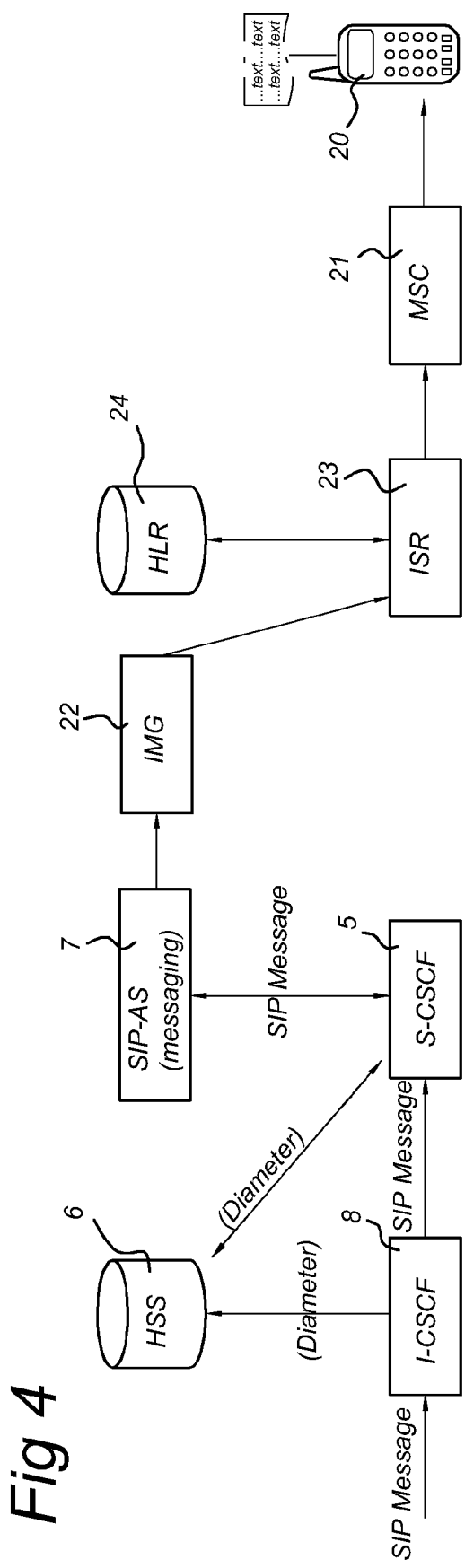

METHOD AND SYSTEM FOR MESSAGE ROUTING IN IMS AND CIRCUIT SWITCHED NETWORKS

This application is the U.S. national phase of International Application No. PCT/NL2008/050304, filed 23 May 2008, which designated the U.S., the entire contents of which is hereby incorporated by reference.

FIELD OF THE INVENTION

The present invention relates to multi access messaging in mobile telephony applications, more specifically to applications in Internet Protocol Multimedia System (IMS) networks.

BACKGROUND

Already it is possible that mobile telephony networks and IMS networks are combined for various applications. E.g. a GSM subscriber attached to a mobile telephony network may obtain basic services, supplementary services and value added services associated with an IMS network. Hereto, the GSM subscriber is registered in the IMS network by means of a contact address associated with a public identifier used for that subscriber in the GSM network. However, up to now, this is restricted to voice call related applications in the IMS network. To enable for a GSM subscriber to use her GSM terminal for the sending and receiving of Short message services, but yet to receive basic services, supplementary services and value added services associated with an IMS network, separate, special messaging application servers are required in the IMS network.

SUMMARY OF THE INVENTION

The present invention seeks to provide messaging related services for a subscriber connected to a circuit switched mobile telephony network such as GSM or UMTS ('circuit switched mobile telephony network' hereafter referred to as 'mobile telephony network'), using an IMS network for receiving basic services, supplementary services and value added services.

According to the present invention, a method for registering a user terminal of a multimedia subscriber being a subscriber of a mobile telephony network, in an IP multimedia system (IMS) network, is provided, comprising registration in the IMS network of a first contact address associated with a circuit switched communication capability of the user terminal for regular communication purposes (i.e. circuit switched (CS) voice, but possibly also circuit switched facsimile or video telephony communications), and registration in the IMS network of a second contact address associated with a circuit switched communication capability of the user terminal for messaging purposes. This terminal may be a multi-mode terminal, including IMS mode. Said contact addresses are associated specifically with the CS communication part of that terminal. By registering a multimedia subscriber in this manner, it is possible for the multimedia subscriber to use (i.e. send and receive) text messages in a regular manner as is common in the CS network. Messaging purposes is understood to encompass text messages, such as SMS and MMS in GSM systems, and non-text messages (e.g. ringtones, user terminal configuration files, etc). Furthermore, it is possible for the multimedia subscriber to receive basic services, supplementary services and value added services for these messages, said basic services, supplementary services and value added services being applied in the IMS network. By registering the multimedia subscriber in this manner, the subscriber may, in addition to using text messages in a manner that is common in the CS network, use text messages in a manner that is common in IMS networks, depending on terminal capability and access network capability. Use of IMS network related services is possible in a transparent manner, i.e. the user is unaware that she is actually using the IMS network.

In a further embodiment, wherein registration related data is stored in a subscriber database (possibly persistently), the subscriber database being part of the IMS network (or being associated with the IMS network), and being arranged to exchange data with a registration function implemented in the IMS network (or associated with the IMS network). Typically, the subscriber database is provisioned with data from a subscriber provisioning system, with which it can exchange data in both directions. A subscriber database and registration function can be easily implemented in existing network units or in dedicated network units in the IMS network.

In an even further embodiment, the first contact address and second contact address are associated with a first feature tag and second feature tag, respectively, the first and second feature tag also being (persistently) stored in the subscriber database. These data, i.e. said contact addresses, including associated features tags, are then readily available for various functional entities in the mobile telephony network and in the IMS network, and allow unambiguous use of the contact addresses.

In a further embodiment, the first contact address and second contact address are registered using a single message, e.g. a SIP Register request, from the registration function towards a call session control functions (CSCF) in the IMS network. The sending of the SIP Register request message from registration function towards CSCF may be triggered by a stimulus from the subscriber provisioning system or may be triggered from a stimulus internal in the registration function. The sending of the SIP Registration request message may be preceded by data exchange between subscriber database and registration function.

The method in an even further embodiment comprises receiving a text message from the multimedia subscriber (e.g. via a mobile switching center (MSC)) and forwarding the text message to an IMS message gateway (IMG). The IMG is in communication with both the circuit switched network (e.g. with an MSC in the circuit switched network) and the IMS network (e.g. with a serving CSCF or an interrogating CSCF in the IMS network), and acts as short message service center (SMSC) towards the circuit switched network by, among others, being addressable with an SS7 SMSC address and acts as a User agent (UA) towards the IMS network, being addressable with an IP address. Furthermore, the method comprises converting the text message into an IMS message (by the IMG), and routing the IMS message through the IMS network, including possible invocation of originating IMS services in the IMS network. This allows for treating an originating text message, such as an SMS generated in the GSM network, of a multimedia subscriber as a regular originating IMS message in the IMS network, including, among others, the invocation of supplementary services, if applicable, and value added services, if applicable, for this message transmission.

In a further embodiment, routing the IMS message comprises obtaining an address of a serving call session control function (S-CSCF) in the IMS network using a global title (as e.g. used in SS7) derived from the destination subscriber number of the text message (e.g. by querying a subscriber database using said global title, and receiving the address of the call session control function in response), routing the message to the call session control function associated with the obtained address, and validating the IMS message in the call session control function. This embodiment relates to terminating SMS routing, with the IMS network being selected as service domain. This allows for treating a terminating text message, such as an SMS generated in the GSM network, destined for a multimedia subscriber as a regular terminating IMS message in the IMS network, including, among others, the invocation of supplementary services, if applicable, and value added services, if applicable, for this message transmission.

The IMS message can be destined for delivery to a terminal of the multimedia subscriber. The IMS message has then been handled by the serving call session control function (S-CSCF) where the multimedia subscriber is registered, said handling optionally including the invocation of supplementary service(s) and optionally including the invocation of value added service(s). In this case, in a further embodiment, the method further comprises checking whether the multimedia subscriber has an activated IMS messaging client, using hereto an IMS messaging application server in communication with a serving call session control function (S-CSCF) where the multimedia subscriber is registered. If an activated IMS messaging client is registered (which may be known to the IMS messaging application by virtue of the IMS messaging application receiving third party registration notifications from the S-CSCF), then the IMS message is further handled in the IMS network (including the forwarding of the IMS message to a contact address registered in the S-CSCF, said contact address constituting a binding with the IMS messaging client). If an activated IMS messaging client is not registered, then the method comprises forwarding the IMS message (under instruction from the IMS messaging application) to an IMS messaging gateway (IMG), the IMG converting the IMS message into a text message and acting as SMSC (or more precise SMS-GMSC) towards the circuit switched network for delivery of the text message to a terminal of said multimedia subscriber (said terminal residing in the circuit switched network). This embodiment relates to terminating access delivery, using an application server.

In an alternative embodiment (using contact address rather than an application server), the IMS message is again destined for the multimedia subscriber. The IMS message has been handled by the serving call session control function (S-CSCF) where the multimedia subscriber is registered, said handling optionally including the invocation of supplementary service(s) and optionally including the invocation of value added service(s). The method further comprises using a contact address associated with the multimedia subscriber (e.g. using a contact address registered in the S-CSCF), the contact address being the second contact address of the multimedia subscriber, said second contact address being associated with an IMS messaging gateway, IMG, routing the IMS message to the associated IMG, converting the IMS message in a text message, and routing the text message to the circuit switched network (by virtue of the IMG acting as SMS-GMSC towards the circuit switched network). In this case, the routing of a message takes place using the second contact address which is specifically registered for messaging purposes.

If the routing of the text message to the circuit switched network, for the purpose of delivering the text message to a circuit switched terminal of a multimedia subscriber, the multimedia subscriber being the destination subscriber of this text message, fails, the method in a further embodiment comprises using an additional contact address associated with the multimedia subscriber, said additional contact address (hereafter referred to as IMS messaging contact address) being registered in the serving call session control function (S-CSCF) where the multimedia subscriber (being the destination subscriber of this text message) is registered and said additional contact address being associated to a terminal of said multimedia subscriber, said terminal having IMS messaging capability (i.e. containing an IMS messaging client), and routing the IMS message to the IMS messaging client, using said additional contact address. This allows for fallback in the case initial delivery of the message in the form of a text message fails.

In a further embodiment, wherein a second contact address and an IMS messaging contact address are available for the multimedia subscriber, the method further comprises routing the IMS message dependent on priority settings of the second contact address and the IMS messaging contact address. This allows for full flexibility for a multimedia subscriber to have incoming messages delivered to a terminal in the circuit switched network, in the form of a text message, or to a terminal in the IMS network, in the form of a multimedia message.

The present invention further relates to a method for delivery of a text message from a subscriber in a circuit switched network to an IMS subscriber in an IMS network, wherein the IMS subscriber is registered in the IMS network using the method according to any one of the embodiments described above. For this embodiment there is no special requirement on the destination IMS subscriber. It may be a regular IMS subscriber. The method further comprising obtaining an IP address of a call session control function in the IMS network associated with the IMS subscriber (optionally preceded by obtaining a domain name of said call session control function), converting the text message to an IMS message, and routing the IMS message to the IMS subscriber via the call session control function, using the obtained IP address. These functions may e.g. be implemented in an SMSC in the circuit switched network associated with the subscriber sending the message. This embodiment may specifically relate to terminating message routing from GSM to IMS. The sending subscriber does not have to be a multimedia subscriber.

In a further embodiment, the method further comprises obtaining the IP address (and the optional obtaining of the domain name) by interrogating by an SMSC a home subscriber database in the circuit switched network, said home subscriber database being associated with an MSISDN of the destination IMS subscriber. A signaling relay function (SRF), tasked with routing the interrogation message towards the home subscriber database, determines, by means of internal or external database lookup, that the destination subscriber is a subscriber of an IMS network, from a service point of view, as opposed to being a subscriber of a mobile telephony network, from service point of view. As a result, the signaling relay function forwards the interrogation message towards a Home Subscriber System (HSS) in the IMS network, instead of forwarding the interrogation message towards a Home Location register (HLR) in the circuit switched network, both HSS and HLR fulfilling the role of home subscriber database. The interrogation message sent to the Home Subscriber System will be adapted to the message format as applicable for HSS interrogation. The HSS will, when receiving the interrogation message, return a domain name of a call session control function in the IMS network associated with the IMS subscriber. The SRF will, when forwarding the result message, containing the domain name of the call session control function in the IMS network, towards the SMSC, adapt said return message to the message format as applicable in mobile telephony network. The SMSC may, when receiving the result message, containing the domain name of the call session control function in the IMS network, use said domain name to obtain an IP address associated with said call session control function. The SMSC may, finally, deliver the text message, after having converted the text message to an IMS message, to the call session control function in the IMS network. These embodiments allow for a transparent manner of routing text messages towards an IMS network of an IMS subscriber, for the case that the text message originates from a circuit switched network and for the case that the text message arrives from an IMS network. This allows an IMS subscriber to receive a text message (SMS) from a circuit switched network subscriber. The forwarding of the text message from SMSC to the call session control function may be done autonomously by the SMSC or with the aid of a messaging gateway.

Furthermore, the present invention relates to a method for transmitting a text message originating from an IMS subscriber, said IMS subscriber also being a subscriber of a circuit switched network, wherein the IMS subscriber is registered in the IMS network using the method according to any one of the registration embodiments described above. The method further comprises routing the text message to a message interworking unit using an SMSC address, the message interworking unit being arranged to send SIP messages to a call session control function in the IMS network, converting the text message in an IMS message by the message interworking unit and routing the IMS message to the call session control function. The SMSC address is provisioned for the IMS subscriber or configured in the MSC in the circuit switched network where the IMS subscriber is currently registered as GSM subscriber. This embodiment allows transparent handling of an originating text message in an IMS network, without using, for the purpose of the routing the text message to the IMS message, any specific functions in the circuit switched network, such as CAMEL service. The transparent handling of the originating text message in the IMS network includes the optional invocation of Supplementary services and the optional invocation of Value added services, based on user profile of the IMS subscriber.

In an alternative embodiment, a method is provided for transmitting a text message originating from an IMS subscriber, said IMS subscriber also being a subscriber of a circuit switched network, wherein the IMS subscriber is registered in the IMS network using the method according to any one of the registration embodiments described above. The method further comprises invoking a CAMEL service (e.g. in an SCP in the mobile telephony network) upon detection of CAMEL subscription information for originating SMS (MO-SMS-CSI) in the MSC in the circuit switched network where the IMS subscriber is currently registered as GSM subscriber, routing the text message to a message interworking unit under control of the CAMEL service, said routing taking place with an SMSC address associated with the message interworking unit, the message interworking unit being arranged to send SIP messages to a call session control function in the IMS network, converting the text message to an IMS message by the message interworking unit, and routing the IMS message to the call session control function. This embodiment allows for transparent handling of an originating text message in an IMS network, when CAMEL functionality is available in the circuit switched network.

In a further embodiment, the method further comprises including, under control of a CAMEL service, a public service identity and a correlation identifier in the signaling address used for routing the text message from the circuit switched network to the IMS network, a message interworking unit converting the text message to an IMS message and forwarding the IMS message to an IMS service platform (e.g. a SIP Application server, SIP-AS), upon detection of the public service identity in the IMS message, the IMS service platform being functionally coupled to the CAMEL service and being arranged to replace the public service identity and correlation identifier in the IMS message by the desired destination, as initially indicated by the IMS subscriber when sending the text message from the circuit switched network, and further routing the IMS message in the IMS network. The routing of the IMS message in the IMS network includes the optional invocation of Supplementary services and the optional invocation of Value added services, based on user profile of the IMS subscriber. The use of correlation identifier and the routing of the IMS message to the SIP-AS functionally coupled to the CAMEL service, allows for augmenting the IMS message with information that is specific to the GSM access network and that would otherwise not be available in the IMS network. One example of such information is GSM location information.

In a further alternative embodiment, a method is provided for transmitting of a text message originating from an IMS subscriber, said IMS subscriber also being a subscriber of a circuit switched network, wherein the IMS subscriber is registered in the IMS network using the method according to any one of the registration embodiments described above. In this embodiment, an MSC receiving an originating text message from the IMS subscriber comprises SIP signaling capability, and the IMS subscriber is registered in the circuit switched network as a multimedia subscriber (entailing that the subscriber's user profile in the MSC includes special indication). The method further comprises converting the text message into a SIP message in the MSC, and delivering, e.g. using SIP User agent client functionality in the MSC, the SIP message to a serving call session control function (S-CSCF) associated with the IMS subscriber. The SIP message may, depending on network configuration, be sent through a Proxy call session control function (P-CSCF) or through an Interrogating call session control function (I-CSCF), or both, prior to being forwarded to the S-CSCF. The S-CSCF, being the S-CSCF where the IMS subscriber is registered, applies further handling of the message and sends the message to the desired destination, as initially indicated by the IMS subscriber when sending the text message from the mobile telephony network. The handling of the IMS message by the S-CSCF includes the optional invocation of Supplementary services and the optional invocation of Value added services, based on user profile of the IMS subscriber. This allows for providing transparent messaging capability by enhancing the functionality of an MSC in the mobile telephony network.

In a further aspect, the present invention relates to a gateway unit comprising a processing system (i.e. a data processing system as generally known) and being arranged to communicate with a circuit switched network and with an IP multimedia system (IMS) network. The processing system is further arranged to register a user terminal of a multimedia subscriber being a subscriber of the circuit switched network, in the IMS network, using registration in the IMS network of a first contact address associated with a circuit switched communication capability of the user terminal for regular communication purposes (including voice), and using registration in the IMS network of a second contact address associated with a circuit switched communication capability of the user terminal for messaging purposes.

In further embodiments, the gateway unit is further arranged to execute the method embodiments as described above.

The processing system may be implemented as a distributed processing system, using processing resources in one or more network units comprised in the circuit switched network, the IMS network, or a combination of the circuit switched network and the IMS network. E.g., part of the functionality may be implemented in an MSC of a circuit switched network, and part in a call session control function in an IMS network.

Furthermore, the present invention relates to a computer program product comprising computer executable instructions, which when loaded on a processing system, provide the processing system with the functionality of any one of the method embodiments as described above.

SHORT DESCRIPTION OF DRAWINGS

The present invention will be discussed in more detail below, using a number of exemplary embodiments, with reference to the attached drawings, in which FIG. 1 shows a schematic view of a combination of a GSM network and an IMS network;

FIG. 3 shows a schematic view of the route of a text message originating from a multimedia subscriber according to an embodiment of the present invention;

FIG. 4 shows a schematic view of the routing of an IMS message in an IMS network to a multimedia subscriber attached to a circuit switched network according to a further embodiment;

DETAILED DESCRIPTION OF EXEMPLARY EMBODIMENTS

Figure 1:
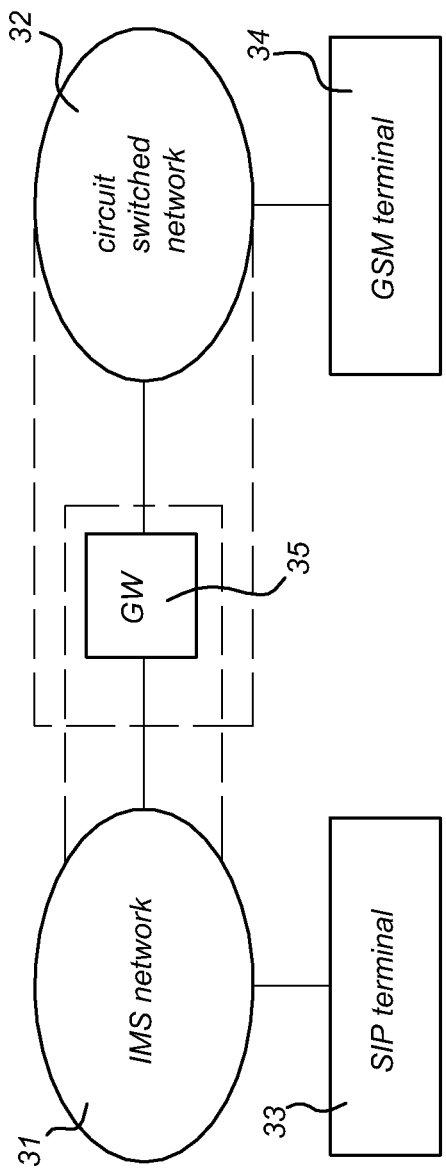

The present invention relates to an IMS (Internet Protocol (IP) Multimedia System) network 31 and a circuit switched (CS) network such as a mobile telephony network 32 (e.g. a GSM, GPRS or UMTS network), as shown schematically in FIG. 1. The IMS network 31 serves a plurality of SIP (Session Initiation Protocol) terminals 33 (one shown in FIG. 1), and the mobile telephony network 32 serves a plurality of user terminals 34 (e.g. a GSM or UMTS terminal, again one GSM terminal 34 shown in FIG. 1). A subscriber to the IMS network 31 may also be a subscriber to the circuit switched network 32. Between the IMS network 31 and circuit switched network 32, a gateway 35 may be positioned, which allows interconnection between the two networks. The gateway 35 may be part of one of the two networks 31, 32, as indicated by the dashed extensions of the networks 31, 32 around the gateway 35.

The gateway 35 may comprise a processing system as is generally known in the art and which is capable of handling various communications using appropriate interfaces. This processing system may be under control of computer executable instructions, which define the actual functioning of the processing system, and hence of the gateway unit 35. The processing system may also be implemented as a distributed processing system, using processing resources which are available in either the circuit switched network, the IMS network, or in both the circuit switched network and the IMS network. The computer executable instructions may be loaded into these network units using known techniques, e.g. by downloading from a computer program product comprising these computer executable instructions (e.g. an optical storage medium, magnetic storage medium, etc.)

According to the present invention a mechanism is provided that facilitates IMS-centralized processing of messaging for an IMS subscriber, considering that:

a message originating from an IMS subscriber may be sent from a GSM/UMTS terminal 34, using the GSM short message service (SMS) or may be sent from a SIP terminal 33, using the IMS Messaging method;

a message destined for an IMS subscriber may be offered to and delivered at a GSM/UMTS terminal 34 of that subscriber or may be offered to and delivered at a SIP terminal 33 of that subscriber.

In the following description, when referring to 'GSM/UMTS terminal' 34, a terminal attached to the GSM, GPRS or UMTS network 32 is meant, using the GSM Direct transfer application part (DTAP) protocol to send a Short message via a Mobile switching centre (MSC) 21 (see e.g. FIG. 3) and a Short message service centre (SMSC) towards the intended destination; or using the GSM DTAP protocol to send a Short message via the Serving GPRS service node (SGSN) and the SMSC towards the intended destination.

An SMS, arriving over DTAP, may be sent to the IMS network 31 (associated with the sender of the SMS) without passing through the SMSC.

Aforementioned attachment to the GSM, GPRS or UMTS network 32 may be accomplished through the Radio access network (RAN), the GSM EDGE Radio access network (GERAN), through the Universal terrestrial radio access network (UTRAN) or through the Generic access network (GAN). When attachment is done through RAN, GERAN or UTRAN, the access network may take the form of a macro network, a micro network, a pico network or a home network. For a home network, femto cell base stations are used.

The message sent to/from a GSM/GPRS etc. terminal 34 as described above is from here onwards referred to as 'GSM Short message', 'Short message' or simply 'SMS'.

When referring to 'SIP terminal' 33, any terminal that has packet switched connection and that encompasses a SIP stack and IMS messaging capability is meant. The SIP terminal 33 requires registration to the IMS network 31 for sending and receiving IMS messages. A SIP terminal 33 may be a wireline device, such as a PC-based soft client, or a wireless device, such as UMTS terminal, WLAN terminal, HSPA terminal containing IMS Messaging capability.

Multi access function (MAF) is a technique facilitating that a GSM subscriber may get services from an IMS network 31. Hereto, the GSM subscriber is registered in the IMS network 31. IMS registration of the GSM subscriber is done through a Registration Function (RF) 3 (see description of FIG. 2 below). RF 3 is a functional entity located in the IMS core network 31 that initiates the IMS registration on behalf of the GSM subscriber. The registration by the RF 3 includes that the RF 3 provides a contact address to the IMS core network 31; more specifically, to a S-CSCF 5 (Serving Call Session Control Function, see also FIG. 2 below). The S-CSCF 5 uses this contact address to deliver a call to the MAF subscriber. The contact address is associated with a Media gateway controller (MGC) in the IMS network 31. The MGC, in combination with a Media gateway (MGW), acts as gateway 35 between IMS network 31 and the circuit switched (CS) network 32 for voice calls.

The Multi access function MAF as described above is developed for voice calls. The current principle and mechanism of MAF may also be applied to fax calls, data calls and video calls. The current MAF can, however, not be applied to messaging. Main reason is that the contact address of the MAF subscriber (e.g. AA709875300@mgc.ims.telenor.se), which is registered at the S-CSCF 5, is associated with a MGC. A MAF subscriber, having a GSM or UMTS phone (user terminal 34), uses CS call methodology for voice calls and may use SMS for messaging. The MGC may act as gateway 35 for voice calls, but can't act as gateway 35 for messaging. Special arrangement is needed for the MAF subscriber for seamless interworking between IMS based messaging and SMS in the GSM network 32. Interworking units (messaging gateway) exist that have the capability to convert between IMS based messaging and SMS. Current shortcoming of MAF, in as far as messaging is concerned, are the following:

when the MAF subscriber initiates a short message (SMS) from her GSM phone 34, this SMS will not pass through IMS network 31;

when an SMS is sent towards the MAF subscriber, special mechanism is needed to send this SMS, based on the subscriber being an MAF subscriber, to the IMS network 31;

when IMS network 31 is processing a (IMS based) message for a subscriber, special service is needed to determine whether this message should be delivered to the subscriber's registered contact address (as would be the case for subscriber with SIP device 33, capable of IMS messaging) or should be routed to a messaging gateway, for conversion to SMS.

In practice, this entails that a special messaging application server is needed in IMS network 31 to facilitate messaging to and from an MAF subscriber. Advantageously, messaging to and from an MAF subscriber should be handled 'seamlessly' in the IMS network 31. An MAF subscriber should be considered as and treated as a regular IMS subscriber. Hence, an IMS message destined for an MAF subscriber should be processed in regular IMS manner and should be delivered to the MAF subscriber, i.e. should be delivered to the MAF subscriber in the form of a Short message.

The basic concept of the present invention is that an MAF subscriber is registered in the IMS network 31 for the purpose of IMS messaging. The IMS related registration of the MAF subscriber relates to messaging to and from the MAF subscriber by means of SMS. In accordance with the MAF concept, the messaging related IMS registration in the IMS network 31 shall be conform IMS principles. When messaging to and from the MAF subscriber takes place, inter working between IMS messaging (internal in the IMS network 31) and SMS (in the GSM network 32) shall take place.

Considering the above, the MAF subscriber has two contact addresses in an embodiment that may be registered through RF 3:

one contact address for voice calls, e.g. AA709875300@mgc.ims.telenor.se; voice calls destined for a MAF subscriber are delivered to this contact address, i.e. are routed to the MGC. The MGC routes the call to a designated GMSC in the PLMN for further processing;

another contact address for messaging, e.g. 709875300@IMG.ims.telenor.se; IMS messages destined for a MAF subscriber are delivered to this contact address, i.e. are routed to an IMS messaging gateway (IMG) 22 (see description with reference to FIG. 3 below). The IMG 22 takes care of delivering the message in the form of SMS to the MAF subscriber.

The MAF subscriber may have a phone with IMS message application (i.e. a SIP terminal 33). This may e.g. be a GPRS or UMTS phone with SIP message client. The IMS message application in such phone 33 may itself register with IMS. In that situation, the MAF subscriber may send and receive IMS messages from this SIP message client. IMS message sending and receiving is in that case done with the contact address associated with the SIP message client, not with the IMS messaging contact address that was registered by the RF 3.

Figure 2:
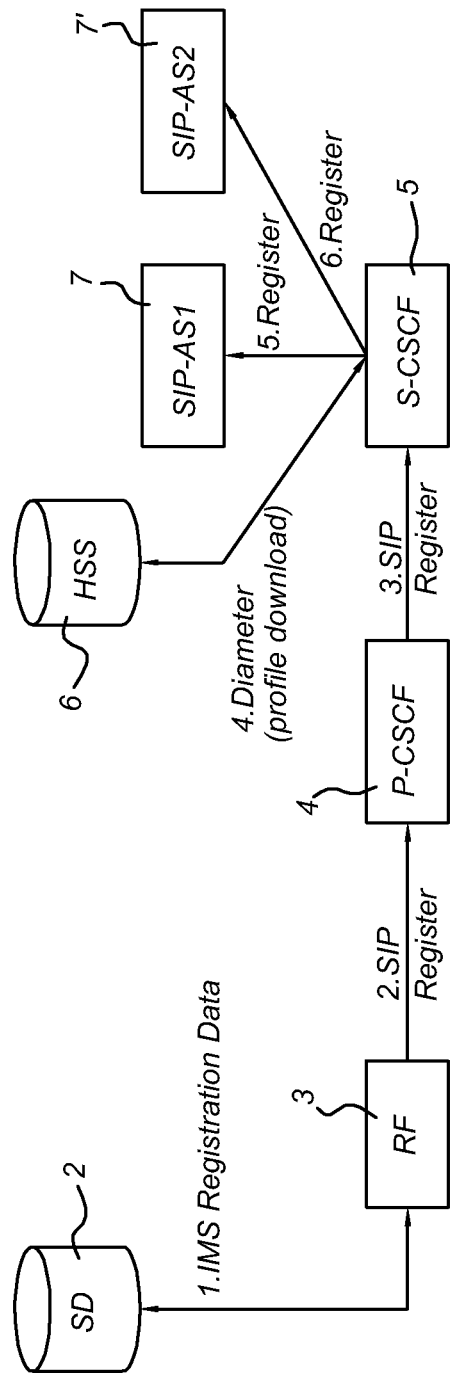
FIG. 2 shows a schematic representation of functions implementing a registration method according to an embodiment of the present invention.

In the embodiments described below, registration for the contact, originating messaging and terminating messaging will be explained in more detail. FIG. 2 shows a schematic view of a high-level architecture for the registration of the contact addresses in the IMS network 31.

A Subscriber Database (SD) 2 is part of the IMS network 31 and contains subscription data for subscribers, including MAF subscribers. Each MAF subscriber has a set of contact addresses. The registration function 3 (RF), which may be a software entity running on a network unit in the IMS network 31, is in communication with the SD 2, and obtains the subscription data for MAF subscribers, specifically the contact addresses to be registered. The RF 3 is also in communication with a Proxy Call Session Control Function (P-CSCF) 4, which in its turn is able to communicate with a Serving Call Session Control Function (S-CSCF) 5. The RF 3 may also be in communication with an Interrogating Call Session Control Function (I-CSCF), which is not depicted, but understood by the person skilled in the art. Such an I-CSCF 4 may be an alternative for a P-CSCF 4 that is used for connecting the GSM terminal 34 to the IMS network 31 (not the P-CSCF 4 that is used to connect a regular IMS terminal to the IMS network 31). The S-CSCF 5 can exchange data with a Home Subscriber Server (HSS) 6, which comprises subscriber data relating to SIP terminals 33 connected to the IMS network 31. Furthermore, in the IMS network 31, one or more SIP Application Servers (SIP-AS) 7, 7' are provided, which can communicate with the S-CSCF 5.

According to a first embodiment of the present invention, each contact address in SD 2 has a feature tag associated with it. A feature tag identifies the IMS communication service (see 3GPP TS 23.228) for which the contact address shall be used. Contact address AA709875300@mgc.ims.telenor.se is associated with voice communication (feature tag=voice) and contact address 709875300@IMG.ims.telenor.se is associated with messaging (feature tag=IMS message, IM).

In accordance with IETF SIP (RFC 3261) a single SIP Register method may contain multiple contact addresses. Hence, one SIP Register method step may contain the contact address for voice as well as the contact address for messaging. When the S-CSCF 5 has received and processed the registration of these contact addresses for this subscriber (e.g. with public user identity+46709875300@telenor.se), it may apply third party registration, as specified for IMS in 3GPP TS 23.228. The third party registration entails that the S-CSCF 5, depending on the Initial filter criteria (IFC) in the subscriber's user profile, sends a SIP Register to one or more SIP-application servers (SIP-AS) 7, 7'. For example, the IFC may be configured such that the S-CSCF 5 sends SIP Register to a SIP-AS 7' for voice services and SIP Register to another SIP-AS 7 for messaging services. In an embodiment of the present invention, these two SIP-AS's 7, 7' may be one and the same SIP-AS 7.

The MAF subscriber may have one or more IMS public user identities (IMPU), e.g. IMPU1=sip:+46709875300@telenor.se and IMPU2=tel:+46709875300. The MAF subscriber is reachable for voice and for IMS messaging on both IMPUs. Implicit registration may be applied for this subscriber to register the multiple IMPUs through a single registration action.

The S-CSCF 5 may be configured to contain a list of addresses of 'trusted entities'. When the S-CSCF 5 receives a SIP Register, SIP Invite, SIP Message (or other SIP method) from an entity which address is contained in this list, then the S-CSCF 5 skips authentication for this SIP request. The address of the RF 3 would be included in this list, so no authentication is needed for the SIP Registration coming from the RF 3 (via P-CSCF 4).

Originating SMS by MAF subscriber shall be routed through IMS network 31 as an originating IMS message. The processing of the originating IMS message in the IMS network 31 shall occur in accordance with all standard IMS methods, including service invocation (based on the IMS-M feature tag), message routing and charging. The registered user profile of the subscriber may contain initial filter criteria that have the effect that originating IMS message triggers an IMS service.

In FIG. 3, a schematic diagram is shown of the flow of an SMS message originating from an MAF subscriber terminal 20 into an IMS network.

When the MAF subscriber terminal 20 initiates a short message (SMS), the SMS is routed from the MSC 21 in the GSM network 32 via the IMG 22 into IMS network 31. The routing of an SMS is based on the SMSC address in the MAF subscriber terminal 20, this follows normal principles in GSM. FIG. 3 further shows how originating SMS by the MAF subscriber is handled in the IMS network 31.

The IMG 22 receives the MAP MO-ForwardSM message from the MSC 21. This MAP message and other MAP messages are specified in 3GPP TS 29.002. The main elements carried in MO-ForwardSM message are the MSISDN of the sender of the SMS (e.g. +46709875300), the destination for the SMS (e.g. +31651613908) and the message body. IMG 22 converts from SMS (MAP) to IMS Message (SIP). It then sets the following SIP Message headers:
From: tel:+46709875300
Request-URI: tel:+31651613908

This IMG 22 is configured to send the SIP Message to a preconfigured proxy CSCF (P-CSCF 4) address or interrogating CSCF (I-CSCF; not depicted). The selection of this P-CSCF 4 address may be based on the usage of a designated Global Title (GT) as SMSC address for the MAF subscriber. This GT, stored in the GSM phone 20 and used for sending the MAP message to the SMSC, indicates to the IMG 22, acting as SMSC, that it shall send the SIP Message to this preconfigured P-CSCF 4 address. In addition, IMG 22 sets the 'orig' header in the SIP Message, to indicate that this SIP Message relates to an originating service.

This preconfigured P-CSCF 4 is the P-CSCF where the MAF subscribers are registered. Since the MAF subscriber is registered in this P-CSCF 4, the P-CSCF 4 will validate the SIP Message and will, after validation, forward the SIP Message to the S-CSCF 5. The P-CSCF 4 may set the P-Asserted-Identity (PAI) in the SIP Message to default IMPU that P-CSCF 4 received from S-CSCF 5 during registration, e.g. sip:+46709875300@telenor.se.

The S-CSCF 5 will, when receiving the SIP Message, match the PAI from this SIP Message with one of the registered IMPUs. In this example, this SIP Message matches with the MAF subscriber who is registered with IMPU sip:+46709875300@telenor.se. The further processing of the SIP Message follows regular IMS principles, such as invoking zero or more IMS services (using SIP-AS 7), finding a destination for the SIP Message and forwarding the SIP Message to that destination.

The S-CSCF 5 will assign a second PAI to the SIP Message, namely the MAF subscriber's IMPU that has tel: format, tel:+46709875300. If the destination subscriber for this SIP Message is a GSM phone (user terminal) 34, then the tel: format PAI may be used for setting the Calling party number (CgPN) in the MAP message towards the destination subscriber.

The address of the IMG 22 may be included in the list of trusted entities in the S-CSCF 5, as described above. In this way, no authentication will be done for SIP Message coming from IMG 22 by the S-CSCF 5.

Figure 5:
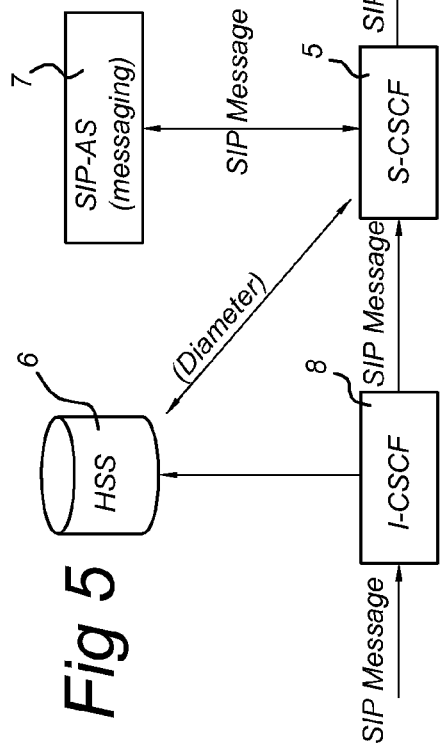
FIG. 5 shows a schematic view of the routing of an IMS message in an IMS network to a multimedia subscriber attached to an IMS network according to a further embodiment.

The following describes the IMS Message interworking method as currently implemented (i.e. the further handling of the IMS message as generated by the S-CSCF 5 in FIG. 3), using the schematic diagrams of FIGS. 4 and 5 for two different embodiments. In general, when a terminating IMS Message arrives in the S-CSCF 5 of the destination subscriber, in our case the MAF subscriber, then an IMS Messaging (IMS-M) service is invoked using a SIP-AS 7. The invocation of the IMS Message service is based on filter criteria of the MAF subscriber. The filter criteria are configured such that the IMS-M service is invoked when the SIP request indicates Messaging, i.e. SIP Message. The IMS-M service application determines whether the message shall be delivered as SMS or shall be routed to the MAF subscriber's IMS Messaging client (SIP terminal 33).

The following describes a first embodiment for delivering a message to the MAF subscriber (i.e. user terminal 20), in the form of an SMS, under control of an IMS Messaging (IMS-M) application server (AS) 7. This is depicted schematically in FIG. 4. The IMS message arrives at an Interrogating CSCF (I-CSCF) 8 in the IMS network 31. The I-CSCF 8 consults the HSS 6 to determine which S-CSCF 5 should handle this IMS message, and forwards the IMS message to this S-CSCF 5.

When the IMS-M application in the SIP-AS 7 is invoked by the S-CSCF 5, it knows whether the MAF subscriber has an IMS Messaging capable client installed and active. When the MAF subscriber activates the IMS Messaging client, the client will register itself with the IMS network 31, as described above. The IFC of the MAF user are such that the S-CSCF 5 applies third party registration towards the IMS-M application in the SIP-AS 7; hence, the IMS-M application will know, by virtue of said third party registration, whether the MAF subscriber has an IMS Messaging capable client installed and active.

If the IMS-M application in SIP-AS 7 has ascertained that the MAF subscriber does not have an IMS Messaging client, then the IMS-M application forwards the IMS Message to the IMG 22. The IMG 22 will, in turn, forward the IMS Message to an Intelligent SMS Router (ISR) 23, which performs the following tasks:
  convert the IMS Message to SMS;
  act as SMSC for terminating SMS delivery, including contacting the HLR 24 and forwarding the SMS to the destination MSC 21.

The Diameter interaction between S-CSCF 5 and HSS 6 is optional; it is used when the MAF subscriber is not IMS registered when the IMS Message arrives.

FIG. 5 shows a schematic diagram of a second embodiment, which is suitable for routing the IMS Message to the MAF subscriber's IMS Messaging client 20. The IMS-M application in SIP-AS 7 had received the SIP Register when the IMS Messaging client 20 registered itself. Hence, when the IMS-M application in SIP-AS 7 receives the SIP Message from the S-CSCF 5, it knows that the MAF subscriber is capable of receiving the SIP Message. So, the IMS-M application takes no special action, but returns the SIP Message to the S-CSCF 5. The S-CSCF 5 then uses the IMS Messaging contact address of the MAF subscriber's IMS Messaging client 20 and sends the SIP Message client towards the MAF subscriber (e.g. via P-CSCF 4).

The following embodiments described below with reference to FIG. 6 use the registered contact address in the S-CSCF 5. This contact address relates specifically to message delivery (routing) to the MAF subscriber via SMS.

Figure 6:
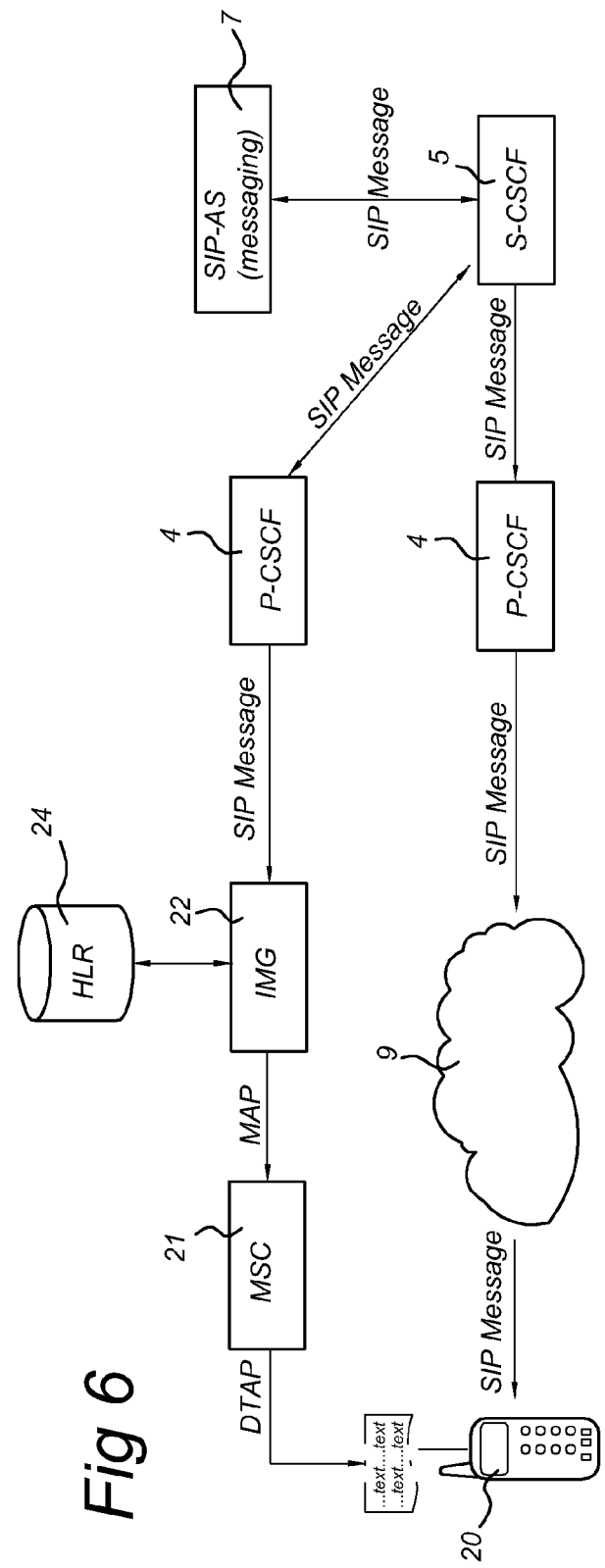
FIG. 6 shows a schematic view of the routing of an IMS message in an IMS network to a multimedia subscriber either via circuit switched network or via an IMS network according to a further embodiment.

FIG. 6 depicts schematically the delivery of an IMS message to a MAF subscriber. In a first embodiment, only the upper branch of this schematic is used. When the S-CSCF 5 of the MAF subscriber processes an IMS Message, it selects a contact address that has feature tag corresponding to the IMS messaging communication service. Hence, the S-CSCF 5 will use the contact address 709875300@IMG.ims.telenor.se for delivering this message to the destination subscriber (user terminal 20). This contact address has the effect that the S-CSCF 5 routes IMS Message to img.ims.telenor.se, i.e. to the messaging gateway IMG 22 (via P-CSCF 4). The messaging gateway, IMG 22, uses the user part of the Request-URI (709875300) as destination for the message. The sending of a Short message to the MAF subscriber is done in accordance with standard GSM SMS messaging methodology, including the use of MAP to the HLR 24 (by IMG 22) and the use of MAP to the destination MSC 21. Details of SMS delivery in the GSM network 32 are therefore not further worked out in the present disclosure.

The delivery of the message to the MAF subscriber, in the form of an SMS, is transparent for the IMS network 31, including optional IMS service(s) invoked from S-CSCF 5 (e.g. in SIP-AS 7). The registered contact address is used for routing the message and for conversion of the IMS message to a Short message. The optional IMS service(s) invoked from S-CSCF 5 may be used for functions like incoming messaging screening, Extended CLIP, charging etc.

The IMS message may be sent towards the MAF subscriber using any of her IMPUs, e.g. tel:+46709875300. It is transparent for the sender of the IMS message whether the destination subscriber is receiving the IMS message on a SIP phone 33 or on a GSM phone 34, in the form of an SMS. Hence, the sender of the IMS message is not aware that the destination subscriber may be a MAF subscriber. The IMG 22 depicted in the upper branch of FIG. 6 contains the message conversion capability as well as short message delivery capability, i.e. acts as SMSC.

The lower branch of the schematic of FIG. 6 depicts delivery of an IMS message to a registered IMS messaging client (in user terminal 20) of an MAF subscriber, i.e. a second embodiment of delivery of a message. In this case, the SIP message is transferred from the S-CSCF 5 to P-CSCF 4 and onwards via an IP network 9 to the user terminal 20. The MAF subscriber in this embodiment has two registered contact addresses in the S-CSCF 5 related to messaging:
  One contact address that is associated with the messaging gateway, e.g. 709875300@img.ims.telenor.se. This contact address is registered by the registration function RF 3 (see above). It is used for delivering a message to the MAF subscriber by sending the message through the messaging gateway 22 and having the gateway convert the IMS message to Short message.
  Another contact address that is associated with the SIP messaging client in the MAF subscriber's mobile terminal 20. This contact address, which may have the form of e.g. an IP v4 address, is registered in the S-CSCF 5 by regular IMS registration action by the SIP messaging client in the MAF subscriber's mobile terminal 20.

When the S-CSCF 5 processes an IMS message for an MAF subscriber who has two contact addresses registered for messaging, then priority setting for the respective contact addresses is used to select which contact address shall be used first for delivering the message. In an embodiment of the present invention, the contact address of the SIP messaging client 33 (in user terminal 20) may have a higher priority value than the contact address associated with the messaging gateway. In such situation, the S-CSCF 5 would attempt to deliver an IMS message to the SIP messaging client 33. Failing that, the S-CSCF 5 would attempt to deliver the message to the MAF subscriber through the messaging gateway 22 (and ultimately to the user terminal 20).

The following situations may occur:
(1) MAF subscriber has GPRS/WLAN coverage and IMS messaging (IMS-M) client 33 is registered. S-CSCF 5 uses contact address of SIP client 33 to deliver IMS message (lower branch in FIG. 6).
(2) MAF subscriber is outside GPRS/WLAN coverage and so, SIP client 33 is not registered. S-CSCF 5 uses the other contact address with the IM feature tag. IMS message is now sent to IMG 22, as described earlier (upper branch in FIG. 6).
(3) MAF subscriber has GPRS/WLAN coverage and SIP client 33 is registered. S-CSCF 5 uses the contact address of SIP client 33 to deliver IMS message (lower branch). Message delivery to IMS-M client fails. S-CSCF 5 uses the other contact address with IM feature tag. IMS message is now delivered to IMG 22, as described earlier (upper branch).

FIG. 6 also applies to an embodiment, in which an IMS Message is delivered to the MAF subscriber, in the case that two messaging related contact addresses are registered in the S-CSCF 5. The S-CSCF 5 first uses the contact address related to the IMS Messaging client 33 of the MAF subscriber; if delivery fails, then the S-CSCF uses the contact address related to the IMG 22. The delivery of the message to the MAF subscriber, either in the form of an IMS message or in the form of an SMS, is transparent for the IMS network 31, including optional IMS service(s) (invoked using SIP-AS 7). The registered contact addresses are used for routing the message and for conversion of the IMS message to a Short message, when needed. The optional IMS service(s) invoked from S-CSCF 5 may be used for functions like incoming messaging screening, extended CLIP, charging etc.

According to the various embodiments described above, MAF subscriber may receive IMS messages on her GSM phone 34. The IMS messages are converted to Short message before delivery to the MAF subscriber. If the MAF subscriber has IMS messaging client 33 active on her phone (e.g. using GPRS/UMTS), then the IMS network 31 will first attempt to deliver the IMS message to the IMS messaging client 33 and will use delivery through SMS as fallback method.

The method embodiments described in this invention disclosure fits in neatly with the Multi access function (MAF) concept. The delivery of IMS message to the MAF subscriber is transparent for IMS service(s) that may be active in the IMS network 31.

IMS subscribers want to be able to receive Short messages from GSM subscribers. When a GSM subscriber sends a Short Message, it uses an E.164 number to address the IMS subscriber. In fact, the sender of the SMS does not need to know that the destination of this SMS is an IMS subscriber. The SMS that is sent towards the IMS subscriber should be delivered to the IMS network 31, so the IMS network 31 can apply regular IMS services on the IMS Message and then deliver the message to the IMS subscriber, e.g. by sending the message to the subscriber's SIP client in his/her IMS terminal 33. The IMS network 31 is thus the serving domain for delivery of the message.

Figure 7:
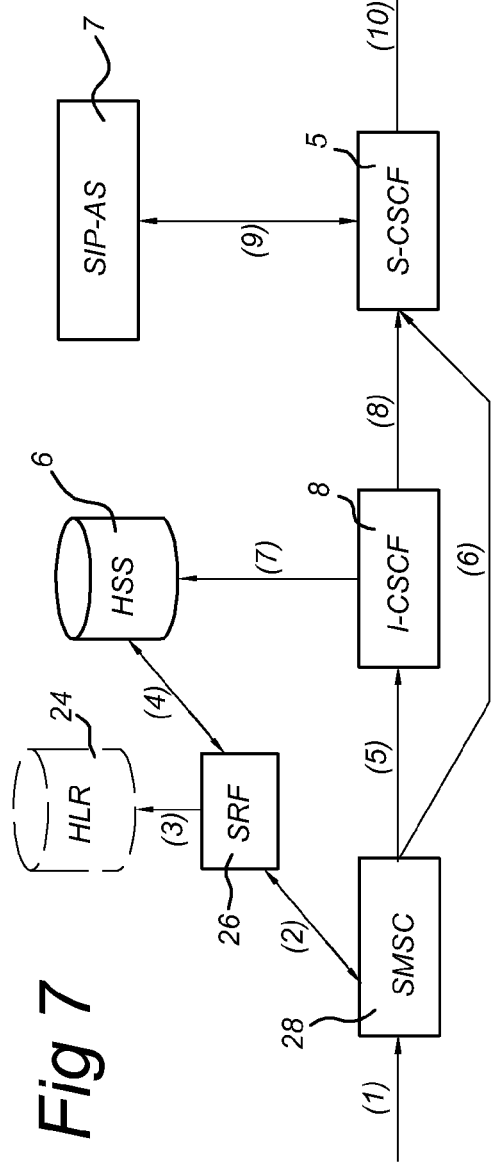
FIG. 7 shows a schematic view of routing of an originating text message in an IMS network according to a further embodiment.

The following embodiment proposes a method for efficient routing of Short Message from a Short message service centre (SMSC) 28 in a mobile telephony network 32 to the IMS network 31 of the intended recipient of the Short message. Depending on the capabilities of the SMSC 28, the Short message may be sent from SMSC 28 directly to an I-CSCF 8 of the IMS network 31 of the intended recipient of the Short message. FIG. 7 shows a schematic view of an implementation of this embodiment.

This embodiment entails that the SMSC 28 where the Short message originates (indicated by (1) in FIG. 7) obtains the domain name of the I-CSCF 8 or S-CSCF 5 of the IMS network 31 of the destination subscriber of the Short message. The SMSC 28 obtains this domain name of the I-CSCF 8 or S-CSCF 5 from the Signaling Relay Function (SRF) 26 in the GSM network 32 that is associated with the MSISDN of the destination subscriber (indicated by (2) in FIG. 7). The SMSC 28 is in this embodiment equipped with capability to convert a Short message to an IMS Message. Such capability, to convert between SMS and IMS Message, is e.g. available in the IMS Messaging Gateway (IMG 22), which can be implemented as part of the SMSC 28. The SMSC 28 uses the received domain name of the I-CSCF 8 or S-CSCF 5 to route the message, after conversion to IMS Message, to the IMS network 31 (either to I-CSCF 8 (5) or to S-CSCF 5 (6)). The IMS network 31 applies regular processing of the received IMS Message.

In a first embodiment alternative, the SMS is routed based on the address of the S-CSCF 5 (path (6) in FIG. 7). The principle of this method is that the SRF 26 is enhanced for SMS routing query. Regular method for terminating routing of SMS entails that the SMSC 28 queries the HLR 24 associated with the destination subscriber, i.e. the intended receiver of the SMS. The HLR 24 returns IMSI and MSC Address to the SMSC 28. The SMSC 28 forwards the SMS to the indicated MSC (not shown in FIG. 7); the MSC uses the IMSI, which is included in the SMS transfer from SMSC 28 to MSC, to deliver the SMS to the intended receiver of the SMS.

The proposed enhanced method is further explained by means of step-by-step message sequence description, with reference to FIG. 7. The numerals between brackets in FIG. 7 do not represent sequential signalling, but are used to mark processes or reference points (interfaces), as explained in detail in Table 1.

TABLE 1 message sequence for S-CSCF address based SMS routing

| | |
|---|---|
| 1 | The SMSC 28 is processing a Short message destined for a subscriber. The destination subscriber is identified with MSISDN. |
| 2 | The SMSC 28 contacts the HLR 24 of the destination subscriber. Hereto, the SMSC 28 sends MAP message Send Routing Info for SM (SRI-SM) towards HLR 24. HLR query for SMS is strictly speaking done by SMS Gateway MSC (SMS-GMSC). Normally, the SMS-GMSC is integrated in the SMSC 28. The remainder of the present description assumes therefore that SMS-GMSC is integrated in the SMSC 28.<br>The SMSC 28 uses the destination subscriber's MSISDN as global title (GT) for the routing of this MAP message. The use of this GT has the effect that the MAP message is sent towards the HPLMN associated with this MSISDN. Within the HPLMN associated with this MSISDN, the MAP SRI-SM message is intercepted by a Signaling relay function (SRF) 26, which is standardised in 3GPP. The SRF 26 contains a look-up table containing an entry for each subscriber of the HPLMN. The search field for the table, used to find the entry for a particular subscriber, may be IMSI or MSISDN. The entry for a subscriber defines various mappings, including:<br>MSISDN to HLR GT; this is e.g. used for the routing of MAP SRI coming from GMSC or for the routing of MAP SRI-SM coming from SMS-GMSC;<br>IMSI to HLR; this is e.g. used for the routing of MAP Location Update coming from MSC or for the routing of MAP Any time interrogation (ATI) coming from the gsmSCF, in the case that the gsmSCF uses IMSI for routing the MAP ATI. According to prior art, SRF 26 would select the HLR GT for this subscriber and would forward the MAP SRI-SM to that HLR 24. The HLR 24 will then process the MAP message and return IMSI and MSC Address to the SMS-GMSC, facilitating the SMS-GMSC to deliver the Short message to the destination subscriber (step (3)). |
| 4 | The present invention proposes that the subscriber's record in SRF 26 is extended with an additional field: HSS 6 address. This entry effectively states that this subscriber is an IMS subscriber and incoming messaging shall be sent to IMS 31.<br>SRF 26 will, for this subscriber, when receiving MAP SRI-SM for this subscriber, not forward this MAP SRI-SM to this subscriber's HLR 24. Instead, SRF 26 will forward the request for routing information to HSS 6. 'Forwarding to HSS' is done by sending Diameter Location information request (LIR) to HSS 6. |

TABLE 1-continued message sequence for S-CSCF address based SMS routing

6  The HSS 6 returns the address of the S-CSCF 5 where the subscriber is currently registered as IMS subscriber. The response from HSS 6 is contained in a Diameter Location information answer (LIA) message.
The SRF 26 forwards the received response to the SMSC 28. The response from SRF 26 is contained in a MAP SRI-SM Result message. The MAP SRI-SM Result message is extended to be able to contain a S-CSCF 5 address.
The SMSC 28, supporting IMS Messaging, converts the received SMS into IMS Message and sends the IMS Message to the S-CSCF 5 of which it had received the address. The SMSC 28 uses the destination MSISDN of this SMS to set the Request URI (R-URI) in the IMS Message. The calling party number of the SMS, i.e. the sender of the SMS, is used to set the P-Asserted-Identity in the IMS Message. The sending of IMS Message to S-CSCF 5 bypasses I-CSCF 8 and HSS 6 query (from I-CSCF 8), see second embodiment below.
9  The S-CSCF 5 processes the IMS Message as per normal. The R-URI in the IMS Message matches a stored user profile in S-CSCF 5. The S-CSCF 5 can hence apply regular terminating messaging handling, including the invocation of IMS Messaging related Value added service (VAS), residing in a SIP-AS 7.
10 The S-CSCF 5 can now deliver the IMS Message to the destination subscriber. The S-CSCF 5 uses the registered contact address for this subscriber to send the IMS Message towards the subscriber's SIP client 33. The IMS Message is sent through the subscriber's P-CSCF 4.
11 The P-CSCF 4 forwards the IMS Message to the subscriber's SIP client 33.

If the destination subscriber does not have a SIP client 33, e.g., because the subscriber is a GSM subscriber (without IMS capability in her GSM phone 34) then the IMS Message may be delivered to the subscriber in the form of an SMS. For this, the invention embodiments as described in relation to FIGS. 1-6 above may be used.

One aspect associated with delivering the message to the destination subscriber in the form of a regular SMS, is the 'adapted HLR 24 query'. When the Message is routed through a message converter, for converting the message back to SMS, there will again be a query to HLR 24 to obtain MSC Address and IMSI for delivering the SMS at the destination subscriber's GSM phone 34. The HLR 24 query shall in this case contain an indication that the SRF 26 shall apply normal SMS handling, which means that it shall forward the MAP SRI-SM to HLR 24 and shall not send Diameter LIR to HSS 6.

The end result of the method embodiment just described is that we have achieved very effective and efficient routing of terminating SMS to the S-CSCF 5 of the destination subscriber, for regular IMS message handling, in accordance with IMS methodology. This effective message routing is mainly achieved by the enhanced SRF 26, which sends the SMS address query to HSS 6 instead of to HLR 24. This enhancement to SRF 26 is in line with one of the principle tasks of SRF 26, namely to assist in routing subscriber queries to the appropriate HLR 24. In the case of sending a short message towards an IMS subscriber, the 'appropriate HLR' is in fact that subscriber's HSS 6.

Instead of provisioning the subscriber's HSS 6 address in SRF 26, one may simply mark the subscriber as 'IMS subscriber'. The SRF 26 will then send the Diameter LIR to the Subscriber locator function (SLF) in the IMS network 31, which assists in the addressing of the right HSS 6. Using SLF in this manner is in accordance with IMS. Alternatively, SRF 26 and SLF may be co-located or even integrated. Furthermore, the invention may be applied in combination with the Centralised User Database (CUDB) principle, where subscriber databases including, but not limited to HLR 24, HSS 6 and SRF 26 are functionally integrated or combined.

The message sequence for the S-CSCF 5 address based SMS routing is as follows. The SMSC 28 receives a MAP MO-ForwardSMS message, carrying the Short message towards the SMSC 28. Strictly speaking, MAP MO-Forward-SMS is sent to SMS Interworking MSC (SMS-IWMSC). Normally, the SMS-IWMSC is integrated in the SMSC 28. The remainder of the present description assumes therefore that SMS-IWMSC is integrated in the SMSC 28. The Short message may arrive at the SMSC 28 also through other protocol, such as SMPP. The SMSC 28 then sends a request MAP Send Routing Info for SMS to the SRF 26, which then obtains the desired information by using a Diameter Location information message exchange with the HSS 6. The result is sent back to the SMSC 28, which then converts the SMS message in a SIP message, and forwards this to the indicated S-CSCF 5.

For the case that the SMSC 28 does not support IMS Messaging capability, the following fallback option is provided. The SMSC 28 would not be able to process S-CSCF 5 address in the MAP SRI-SM Result received from the SRF 26. The SMSC 28 should in this case receive information in MAP SRI-SM Result for normal SMS processing.

In a first fallback method embodiment, the SMSC 28 includes an explicit indication in the MAP SRI-SMS message towards the SRF 26, about its IMS Messaging capability. If MAP SRI-SMS indicates that SMSC 28 supports IMS Messaging, SRF 26 may return a S-CSCF 5 address to SMSC 28. Otherwise, SRF 26 will apply normal SMS handling, i.e. will contact HLR 24 and return an MSC address and IMSI. The SMSC 28 will in the latter case forward the Short message directly to an MSC 21 in the telephony network 32, without going through IMS network 31.

In a second fallback method embodiment, the SRF 26 maintains a list of SMSCs 28 that have IMS Messaging capability. In this way, SRF 26 can decide whether it may return S-CSCF 5 address to SMSC 28. If, for a particular SMS routing query, the sending of S-CSCF 5 address to SMSC 28 is not allowed, then the SRF 26 may return MSC Address and IMSI, as described above.

The above-described fallback mechanisms, for either method embodiments, is that the SMS is sent to the MSC 21 directly, in the regular manner, thereby bypassing IMS network 31.

Instead of using a fallback mechanism by returning MSC Address and IMSI to SMSC 28, the SRF 26 may return the SS7 address of a Messaging Gateway (not shown). SRF 26 would still need to contact HLR 24 in order to obtain the destination subscriber's IMSI. The SMSC 28 would, when receiving MAP SRI-SM Result, send the SMS to the Messaging gateway. The Messaging gateway converts the message to IMS Message and forwards the message to I-CSCF 8 in IMS network 31. The R-URI for the IMS Message would in this case be set to the IMSI of the destination subscriber. This implies that the IMSI of this subscriber is implicitly registered as Public user identity (IMPU) in S-CSCF 5.

Instead of returning IMSI to the SMSC 28 in the fallback case, it may be considered to return the subscriber's MSISDN in the IMSI parameter in MAP SRI-SM Result. IMSI may contain 15 digits, so the MSISDN will fit in the IMSI parameter. Returning the MSISDN in the fallback case would dispose with the necessity to register the subscriber's IMSI in IMS. It is hereby assumed that SMSCs 28 don't perform any check on the IMSI in MAP SRI-SM Res, as the digit structure of IMSI differs from the digit structure of MSISDN.

When the destination subscriber is currently not registered in IMS network 31, then the HSS 6 would not return a S-CSCF 5 address in step 4. The HSS 6 would instead return S-CSCF capabilities. S-CSCF capabilities are sent by HSS 6 to I-CSCF 8, enabling I-CSCF 8 to allocate a S-CSCF 5 for this call or message. The I-CSCF 8 uses a table to map S-CSCF capabilities to a particular S-CSCF 5.

The present embodiment proposes that the SRF 26 is equipped with the same mapping table. Hence, when SRF 26 receives S-CSCF capabilities instead of S-CSCF address, it will use said table to select a S-CSCF 5 for this message. SRF 26 will then send this S-CSCF 5 address to SMSC 28. The remainder of message handling is as described above. The S-CSCF 5 will, when receiving IMS Message for an unregistered subscriber, contact HSS 6 to obtain subscriber profile, in accordance with standard IMS methodology.

In a second embodiment alternative, the SMS is routed based on the address of the I-CSCF 8. This method also uses enhanced SRF 26 for SMS routing query. The proposed enhanced method is further explained by means of step-by-step message sequence description, with reference to Table 2.

The further handling of the IMS Message, once it has arrived in S-CSCF 5, is similar to the previous method embodiment (S-CSCF address based SMS routing).

When the destination subscriber is currently not registered in IMS network 31, then the HSS 6 would not return a S-CSCF 5 address in step 7. The HSS 6 would instead return S-CSCF capabilities, enabling I-CSCF 8 to allocate a S-CSCF 5 for this message.

The fallback mechanisms for this method embodiment (I-CSCF address based SMS routing) are similar as the fallback mechanisms that are described for the previous method embodiment (S-CSCF address based SMS routing).

Using these embodiments of the present invention, as graphically depicted in FIG. 7, a transparent manner of routing short messages towards the IMS network of an IMS subscriber is provided. The IMS subscriber may receive an SMS from a GSM subscriber. For this, the SRF 26 (signalling relay function) is enhanced to return I-CSCF 8 or S-CSCF 5 address to SMSC 28. The SMSC 28 may convert the SMS to SIP Message and send the SIP Message to I-CSCF 8 or S-CSCF 5.

No proper mechanism exists for routing an originating Short message by a GSM subscriber in GSM network 32 to IMS network 31 for originating message handling. 3GPP TS 23.204 v7.4.0[1] (Support of Short Message Service (SMS) over generic 3GPP Internet Protocol (IP) access; stage 2') specifies how an SMS may be sent to/from a SIP client in user terminal 20. That specification does, however, not resolve the issue of unified messaging handling for Short messages sent from a GSM terminal 20 by a Multi access function (MAF) subscriber. The MAF subscriber is in essence an IMS subscriber who is using a GSM phone (GSM terminal 34 in FIG. 1) for access. That person's services are invoked in the IMS network 31. The MAF subscriber may also use a SIP phone (IMS terminal 33 in FIG. 1), i.e. have both a GSM phone and a SIP phone.

The method embodiments relating to IMS message handling for originating SMS are worked out below individually. Each method embodiment for submitting the short message

TABLE 2 message sequence for I-CSCF address based SMS routing

Figure 8:
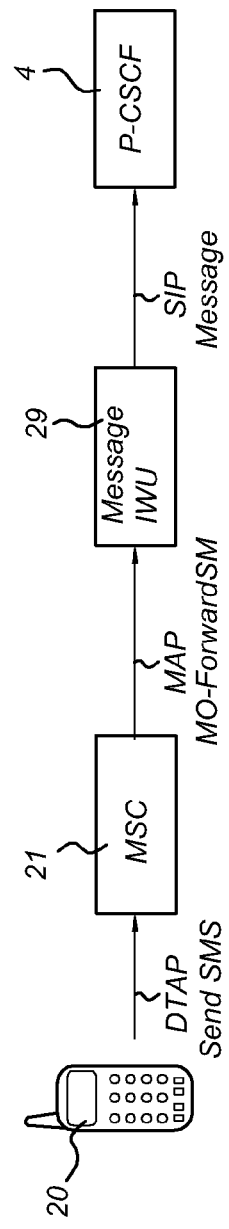
FIG. 8 shows a schematic view of routing of an originating text message to an IMS network according to a further embodiment.

| | |
|---|---|
| 1 | The SMSC 28 is processing a Short message destined for a subscriber. The destination subscriber is identified with MSISDN. |
| 2 | The SMSC 28 contacts the HLR 24 of the destination subscriber, i.e. sends MAP SRI-SM towards HLR 24, using the destination subscriber's MSISDN as global title (GT) for the routing of this MAP message. MAP SRI-SM message is intercepted by SRF 26. |
| 5 | SRF 26 is provisioned to contain for this subscriber an I-CSCF 8 address for Short message query. The I-CSCF 8 address is statically provisioned for the subscriber. Hence, SRF 26 does not need to query HSS 6 at this point, i.e. does not need to support Diameter. SRF 26 returns the I-CSCF 8 address to SMSC 28. The response from SRF 26 is contained in a MAP SRI-SM Result message. The MAP SRI-SM Result message is extended to be able to contain an I-CSCF 8 address.<br>The SMSC 28, supporting IMS Messaging, converts the received SMS into IMS Message and sends the IMS Message to the I-CSCF 8 of which it had received the address. The SMSC 28 uses the destination MSISDN of this SMS to set the Request URI (R-URI) in the IMS Message. The calling party number of the SMS, i.e. the sender of the SMS, is used to set the P-Asserted-Identity in the IMS Message.<br>As an option, when SMSC 28 applies DNS query to obtain IP address for the indicated I-CSCF 8, DNS applies load sharing between multiple I-CSCFs 8. |
| 7 | I-CSCF 8 will, when receiving IMS Message, contact HSS 6 in order to obtain S-CSCF 5 address for this subscriber. Contacting the HSS 6 occurs in accordance with IMS standard methodology. |
| 8 | I-CSCF 8 forwards the IMS Message to the S-CSCF 5 where the subscriber is registered. Forwarding IMS Message from I-CSCF 8 to S-CSCF 5 occurs in accordance with IMS standard methodology. | to the IMS core network 31 follows the principle as depicted in FIG. 3. The solutions have in common that the Short message that is generated by the MAF subscriber in the GSM network 32 (i.e. by user terminal 20 in FIG. 8) needs to be routed to the IMS network 31 (via P-CSCF 4), in the form of an IMS message. In the IMS network 31, the IMS Message shall arrive at S-CSCF 5 where the MAF subscriber is registered as an IMS Messaging subscriber. The S-CSCF 5 uses the IMS user profile of the MAF subscriber for the invocation of originating IMS service(s).

The embodiment alternatives differ in the manner in which the IMS Message is routed to the originating S-CSCF 5.

A first embodiment alternative relates to non-CAMEL message transfer. The SMSC address from the MAF subscriber's SIM card or GSM user terminal 20 is used for transferring the message to a Message Interworking Unit (M-IWU) 29 and from there to a P-CSCF 4, as shown schematically in FIG. 8. The M-IWU 29 in part performs the same functionality as the IMG 22 in the embodiments described above, including the SMSC function (see e.g. FIG. 3).

The M-IWU 29 recognises from the MAP destination address (in MAP MO-ForwardSM), used to route the SMS from MSC 21 to M-IWU 29 (acting as SMSC), that the message originates from a MAF subscriber 20. The M-IWU 29 instantiates a SIP User Agent Client (UAC) and sends SIP Message towards the P-CSCF 4 the address of which it received when the MAF Subscriber registered in the IMS network 31. Alternatively the M-IWU 29 sends the SIP Message towards an I-CSCF 8 which will result in the I-CSCF 8 assigning a S-CSCF 5, based on S-CSCF capabilities received from HSS 6, to handle originating unregistered services for the MAF Subscriber. If the M-IWU 29 sends the SIP Message to an I-CSCF 8 (not shown in FIG. 8), the I-CSCF 8 deduces from the presence of the 'Orig' parameter in the SIP Message, that it shall apply originating session handling, as opposed to terminating message handling. The 'orig' parameter is included in the SIP Message by the M-IWU 29. The SIP UAC instance is maintained until the SIP Message transfer is complete. Practically, this means that the M-IWU 29 has received the SIP 200 OK or other final SIP response.

The MAF subscriber 20 may be in his/her Home PLMN (HPLMN) or may be roaming in another PLMN. The address of the P-CSCF 4 is derived from the address that is used for the message transfer from MSC 21 to M-IWU 29. Strictly the message may be sent to 1 of n M-IWUs 29; each M-IWU 29 has the capability to instantiate a SIP UAC for message transfer. The handling in the M-IWU 29 for the sending of a SIP Message, in response to receiving a Message from MSC 21 originating from MAF subscriber 20, is not subscriber-specific.

The M-IWU 29 uses the MAF subscriber's address, as contained in MAP MO-ForwardSM message, to set the from: field in the SIP Message. The M-IWU 29 uses the destination subscriber, as also contained in the MO-ForwardSM message, to set the to: field in the SIP Message. The P-CSCF 4, in turn, uses the from: field for validation and to set the P-Asserted-Id in the SIP Message.

If multiple P-CSCFs 4 are used, then the respective MAF subscribers shall have different M-IWU 29 addresses provisioned on the SIM card. The M-IWU 29 sends the SIP Message to the correct P-CSCF 4, based on the MAP destination address used to route the SMS from MSC 21 to M-IWU 29. The M-IWU 29 address on the SIM card is provisioned by administrative means.

A further improvement to the method embodiment just described is the inclusion of location information in the MAP MO-ForwardSM message. The MSC 21 may be enhanced to place the MAF subscriber's current location in the argument of said MAP Message. See below extract from 3GPP TS 29.002 v7.8.0[2], ('Mobile application part') section 17.7.6.

```
mo-ForwardSM OPERATION ::= {           --Timer ml
    ARGUMENT
        MO-ForwardSM-Arg
    RESULT
        MO-ForwardSM-Res
        -- optional
    ERRORS {
        systemFailure |
        unexpectedDataValue |
        facilityNotSupported |
        sm-DeliveryFailure}
    CODE      local:46 }
MO-ForwardSM-Arg ::= SEQUENCE {
    sm-RP-DA              SM-RP-DA,
    sm-RP-OA              SM-RP-OA,
    sm-RP-UI              SignalInfo,
    extensionContainer    ExtensionContainer    OPTIONAL,
    ... ,
    imsi                  IMSI                  OPTIONAL,
    locationInformation   LocationInformation   OPTIONAL}
```

The parameter 'locationInformation' is added to the MAP operation. The LocationInformation data type is already defined in 3GPP TS 29.002[2]. By adding this parameter to the MAP operation, the M-IWU 29 can set the P-Access-Network-Info header in the SIP Message.

Figure 9:
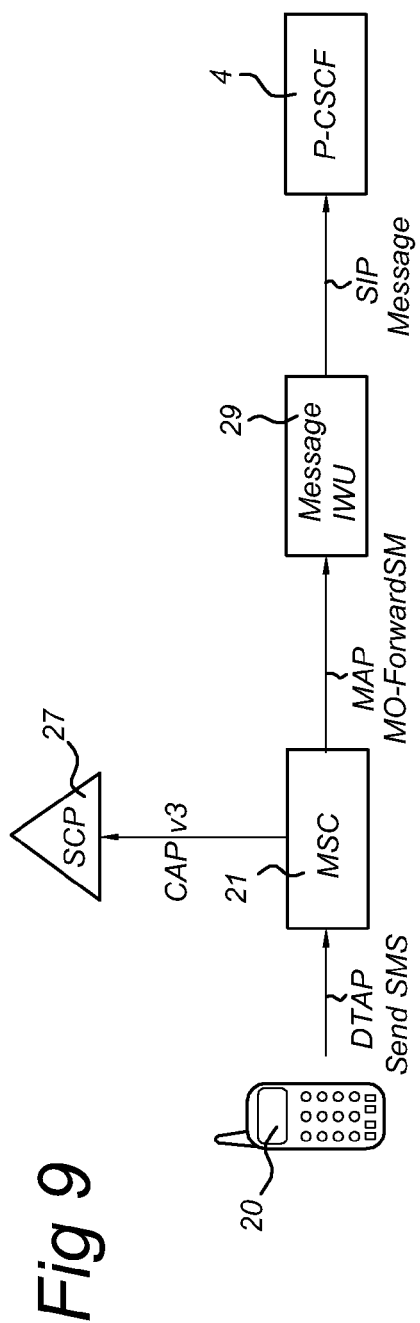
FIG. 9 shows a schematic view of routing of an originating text message to an IMS network using CAMEL according to a further embodiment.

In a second embodiment alternative, the sending of the Message from MSC 21 to M-IWU 29 is under control of a CAMEL service (CAMEL Phase 3 with direct routing). This is reflected schematically in FIG. 9. The triggering of the CAMEL service (being executed in SCP 27) is based on the presence of MO-SMS-CSI in the MSC 21. The MO-SMS-CSI was received from HLR 24, during subscriber registration in the MSC 21 (subscriber 20 attaching to this MSC 21). The CAMEL service forces the message to be sent to the M-IWU 29. The CAMEL service knows, by administrative means, towards which P-CSCF 4 the message shall be sent. If the message is to be sent to an I-CSCF 8 (not reflected in FIG. 9), then the CAMEL service does not need to send the message to a particular I-CSCF 8; any of a group of I-CSCFs 8 may contact the HLR 24 to determine to which S-CSCF 5 to send the SIP Message.

Figure 10:
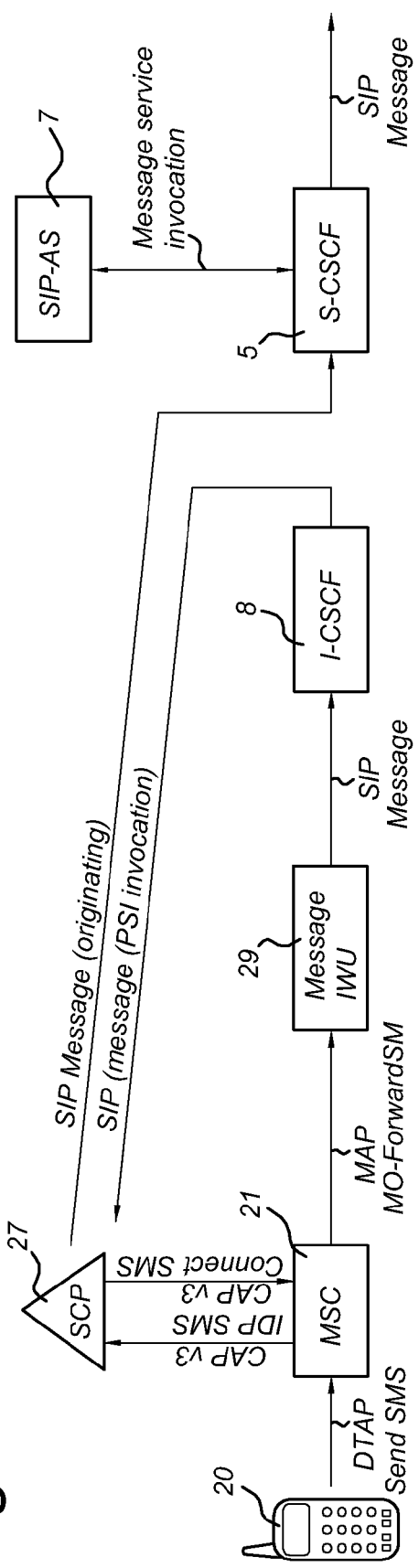
FIG. 10 shows a schematic view of routing of an originating text message to an IMS network using message intercept under CAMEL control according to a further embodiment.

In a third embodiment alternative, the sending of the Message from MSC 21 to M-IWU 29 is again under control of a CAMEL service, but using CAMEL Phase 3 with message intercept. This is schematically shown in FIG. 10. The CAMEL service (running in SCP 27) instructs the MSC 21 to send the Message to the IMS network 31. Within the IMS network 31, the Message, which by now has the form of an IMS Message, is sent to the CAMEL service platform (i.e. SCP 27 in FIG. 10). The sending of the IMS message to the CAMEL service platform (SCP 27) is done using a wildcard public service identity (PSI). The information provided by the CAMEL service to the MSC 21 will be the following:
SMSC Address=Address of M-IWU 29
Destination subscriber number=wildcard PSI
Whereby:
wildcard PSI=<PSI>+<correlation identifier>
The M-IWU 29 uses the Destination Subscriber for the SMS to set the to: field in the SIP Message. The CAMEL service, now acting as SIP Application Server, generates a message into the IMS network 31.

The CAMEL service uses a correlation identifier as SMS destination. The SMSC Address used by the CAMEL service is a routing address associated with the M-IWU 29. The M-IWU 29 takes normal action when receiving a Short message, which is converting the SMS to a SIP Message and sending the SIP Message to an I-CSCF 8 in the IMS network 31. The I-CSCF 8 recognises the destination address of the SIP request (the SIP Message) as a (wildcard) PSI. Hence, the I-CSCF 8 routes the SIP Message to the SIP Application Server associated with that PSI. In an alternative embodiment, the I-CSCF receives the address of the SIP Application Server from the HSS. In another alternative embodiment, the I-CSCF receives from HSS the address of a S-CSCF and forwards the SIP request to that S-CSCF, which forwards it to the SIP Application Server. The PSI allocated by the CAMEL service and provided to the MSC 21 in the form of the Destination Subscriber, is in fact a PSI that is associated with this SCP 27, acting as SIP-AS.

When the SCP 27, acting as SIP-AS, receives the SIP Message, it takes the following actions:

1. Correlate the incoming SIP Message with the CAMEL service that was started when it received the CAMEL Initial DP SMS (IDP-SMS) operation. The PSI that was allocated by the CAMEL service is a 'wild card PSI'. The wild card PSI identifies a Service and includes also a number of remaining address digits. These remaining address digits are used for said correlation.

2. Construct a SIP Message. The SIP Message will contain, amongst others, P-Asserted-Identity of MAF subscriber, to: field (containing destination address of original message submission by the MAF subscriber), Location information of the MAF subscriber carried in P-Access-Network-Info. The SIP Message will contain the Orig parameter.

3. Send the SIP Message to the S-CSCF 5. The SCP 27, acting as SIP-AS, may be aware of the S-CSCF 5 where the MAF subscriber is registered, through third party registration. When the MAF subscriber is registered in the IMS network 31, a third party IMS Registration was routed to the SIP-AS 7, based on initial filter criteria received by S-CSCF 5 from HSS 6. The SIP Message may pass through I-CSCF or P-CSCF, prior to arriving at the S-CSCF 5.

The sending of SIP Message to S-CSCF 5 has the effect that the S-CSCF 5 uses the subscriber's user profile for invoking originating IMS service(s). The advantage of the method described here is that the SIP Message may be augmented with additional, GSM access related information, such as Location information.

Figure 11:
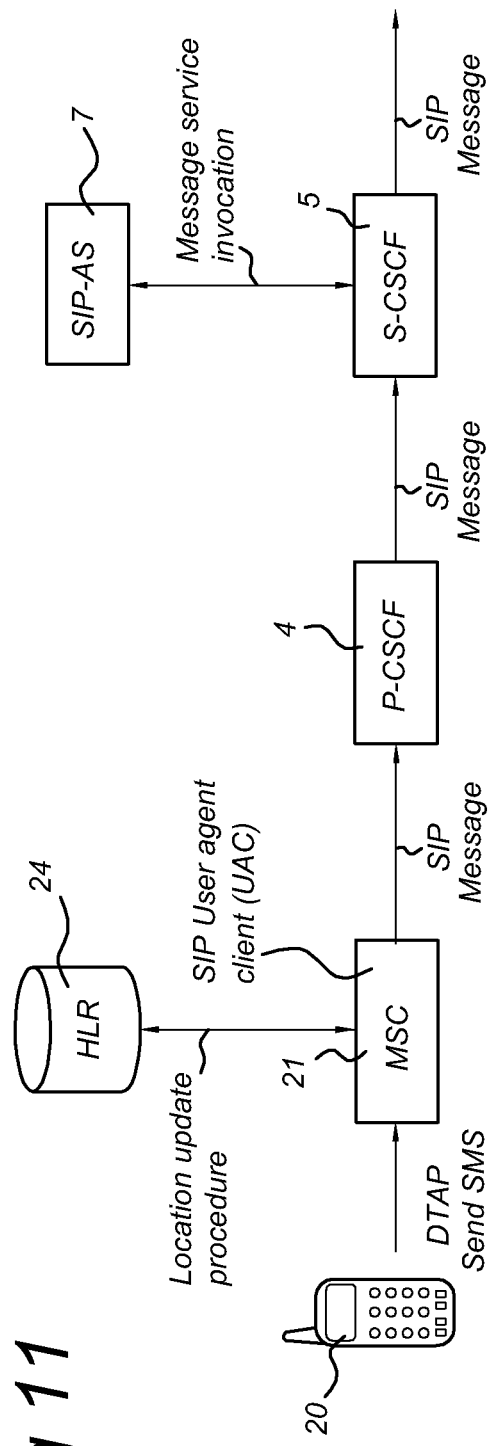
FIG. 11 shows a schematic view of routing of an originating text message to an IMS network using an enhanced MSC in the mobile telephony network according to a further embodiment.

In a fourth embodiment alternative, use is made of an MSC 21 comprising SIP signalling capability. Hence, the MSC 21 may generate a SIP Message and send it towards the IMS network 31. This is depicted schematically in FIG. 11. During location update procedure between MSC 21 and HLR 24, the HLR 24 has indicated to the MSC that for this subscriber, it (the MSC 21) shall apply SMS to IMS Message conversion. When the MAF subscriber 20 submits an SMS, the MSC 21 applies SMS to IMS Message conversion, as previously instructed by HLR 24. The MSC 21 then instantiates a SIP User agent client (UAC) internally and sends the IMS Message to the SIP UAC. The SIP UAC (as part of MSC 21) sends a SIP Message to the P-CSCF 4. In fact, the concept of MSC 21 sending SIP Message directly to the P-CSCF 4 may best be combined with MSC-initiated IMS registration. When the MAF subscriber registers in the MSC 21 (as GSM subscriber), the MSC 21 performs IMS registration for the subscriber; the MSC 21 performs the IMS registration under instruction from the HLR 24. The IMS registration by MSC 21 results in that the MSC 21 receives P-CSCF 4 address for this subscriber. Hence, when the MSC 21 needs to send a SIP Message, resulting from the subscriber submitting an SMS, the MSC 21 has the P-CSCF 4 address available for the sending of the SIP Message. The MSC 21 may include the subscriber's current Location information into the P-Access-Network-Info.

In any of the four embodiment alternatives described above, when a MAF subscriber 20 sends an SMS, the SMS will be routed to IMS network 31 and IMS messaging service(s), including charging, may be invoked for the subscriber. Short messages that are sent by a Multi access function (MAF) subscriber are routed through the IMS network 31, in the form of an IMS Message. The routing of the originating messages to the IMS network 31 is done for the purpose of invoking IMS services for these originating messages. The IMS network 31 forwards the messages to the intended destination. In this way, the MAF subscriber may receive consistent services for originating message submission, whether the messages are sent from his/her GSM phone 34 or through an IMS messaging capable SIP client 33. The message handling will in both cases be purely IMS based.

The invention claimed is:

1. A method, comprising:
   transmitting or receiving a text message originating from a user terminal associated with an IP multimedia system (IMS) subscriber;
   wherein the IMS subscriber is registered in an IMS network by registering in the IMS network a first contact address of the user terminal associated with a circuit switched communication capability of the user terminal for regular communication purposes including for voice calls, and
   registering in the IMS network a second contact address of the user terminal associated with the circuit switched communication capability of the user terminal for messaging purposes,
   wherein a mobile switching center (MSC) receiving an originating text message from the IMS subscriber comprises session initiation protocol (SIP) signaling capability, and the IMS subscriber is registered in the circuit switched network as a multimedia subscriber, the method further comprising:
   converting the text message into a SIP message, and
   delivering the SIP message to a serving call session control function (S-CSCF) associated with the IMS subscriber.

2. The method according to claim 1, wherein registration related data is stored in a subscriber database, the subscriber database being part of the IMS network, and being arranged to exchange data with a registration function implemented in the IMS network.

3. The method according to claim 2, wherein the first contact address and the second contact address are associated with a first feature tag and a second feature tag, respectively, the first feature tag and the second feature tag also being stored in the subscriber database.

4. The method according to claim 1, wherein the first contact address and the second contact address are registered using a single message.

5. The method according to claim 1, wherein the SIP message is destined for the multimedia subscriber registered in a call session control function (CSCF) in the IMS network, the method further comprising:
   checking whether the multimedia subscriber has an activated IMS messaging client using an IMS messaging application server in communication with a serving call session control function (S-CSCF) where the multimedia subscriber is registered,
   if an activated IMS messaging client is registered, then further handling the SIP message in the IMS network, and if an activated IMS messaging client is not registered, then forwarding the SIP message to an IMS messaging gateway (IMG), the IMG converting the SIP message into a text message and acting as a short service message center (SMSC) towards the circuit switched network for delivery of the text message to a terminal of the multimedia subscriber.

6. The method according to claim 1 for delivery of a text message from a subscriber in a circuit switched network to the IMS subscriber in the IMS network, the method further comprising:
obtaining an IP address of a call session control function in the IMS network associated with the IMS subscriber;
converting the text message to a SIP message; and
routing the SIP message to the IMS subscriber via the call session control function, using the obtained IP address.

7. The method according to claim 6, wherein the method further comprises obtaining the IP address by interrogating a home subscriber database in the IMS network, said home subscriber database being associated with a mobile station international subscriber directory number (MSISDN) of the destination IMS subscriber.

8. The method according to claim 1 for transmitting a text message originating from the IMS subscriber, the IMS subscriber also being a subscriber of a circuit switched network, the method further comprising:
routing the text message to a message interworking unit using a short service message center (SMSC) address, the message interworking unit being arranged to send SIP messages to a call session control function in the IMS network;
converting the text message into a SIP message by the message interworking unit;
routing the SIP message to the call session control function.

9. The method according to claim 1 for transmitting a text message originating from the IMS subscriber, the method further comprising:
invoking a Customized Applications for Mobile networks Enhanced Logic (CAMEL) service upon detection of CAMEL subscription information for originating a short message service (SMS) in a mobile switching center (MSC) in the circuit switched network where the IMS subscriber is currently registered as GSM subscriber,
routing the text message to a message interworking unit under control of the CAMEL service, said routing taking place with a short service message center (SMSC) address associated with the message interworking unit, the message interworking unit being arranged to send SIP messages to a call session control function in the IMS network,
converting the text message to a SIP message by the message interworking unit, and
routing the SIP message to the call session control function.

10. The method according to claim 9, further comprising:
including, under control of a CAMEL service, a public service identity and a correlation identifier in the signaling address used for routing the text message from the circuit switched network to the IMS network,
a message interworking unit converting the text message to a SIP message and forwarding the SIP message to an IMS service platform, upon detection of the public service identity in the SIP message, the IMS service platform being functionally coupled to the CAMEL service and being arranged to replace the public service identity and correlation identifier in the SIP message by the desired destination, as initially indicated by the IMS subscriber when sending the text message from the circuit switched network, and
further routing the SIP message in the IMS network.

11. Apparatus comprising:
a processor configured to communicate with a circuit switched network and with an IP multimedia system (IMS) network,
the processor being further configured to transmit or receive a text message originating from an IMS subscriber,
wherein the IMS subscriber is registerable in the IMS network by registering a subscriber's user terminal in the IMS network, where the subscriber subscribes to the IMS network and to the circuit switched network, using registration in the IMS network of a first contact address of the user terminal associated with a circuit switched communication capability of the user terminal for regular communication purposes including for voice calls, and using registration in the IMS network of a second contact address of the user terminal associated with a circuit switched communication capability of the user terminal for messaging purposes,
wherein the processor is further configured to receive an originating text message from the IMS subscriber and has session initiation protocol (SIP) signaling capability, the IMS subscriber being registered in the circuit switched network as a multimedia subscriber, convert the text message into a SIP message, and deliver the SIP message to a serving call session control function (S-CSCF) associated with the IMS subscriber.

12. The apparatus according to claim 11, wherein registration related data is stored in a subscriber database, the subscriber database being part of the IMS network, and wherein the gateway unit is further configured to exchange data with a registration function implemented in the IMS network.

13. The apparatus according to claim 11, in which the processing system is a distributed processing system, using processing resources in one or more network units comprised in the circuit switched network, the IMS network, or a combination of the circuit switched network and the IMS network.

14. A non-transitory computer program product comprising computer executable instructions, which when loaded on a processing system, causes a processing system to perform the method of claim 1.

* * * * *

UNITED STATES PATENT AND TRADEMARK OFFICE
CERTIFICATE OF CORRECTION

PATENT NO. : 9,001,730 B2
APPLICATION NO. : 12/994298
DATED : April 7, 2015
INVENTOR(S) : Noldus et al.

Page 1 of 1

It is certified that error appears in the above-identified patent and that said Letters Patent is hereby corrected as shown below:

Drawings

In Fig. 1, Sheet 1 of 6, delete "Fig" and insert -- Fig. --, therefor at each occurrence throughout the figures.

Specification

In Column 9, Line 40, delete "message" and insert -- message service --, therefor.

In Column 10, Line 37, delete "3 (RF)," and insert -- (RF) 3, --, therefor.

In Column 10, Line 47, delete "I-CSCF 4" and insert -- I-CSCF 8 --, therefor.

In Column 11, Line 43, delete "message" and insert -- message service --, therefor.

In Column 20, Line 25, delete "(Support" and insert -- ( Support --, therefor.

Claims

In Column 26, Line 15, in Claim 11, delete "Apparatus" and insert -- An apparatus --, therefor.

Signed and Sealed this
Twenty-third Day of February, 2016

Michelle K. Lee
*Director of the United States Patent and Trademark Office*